Figure 1:
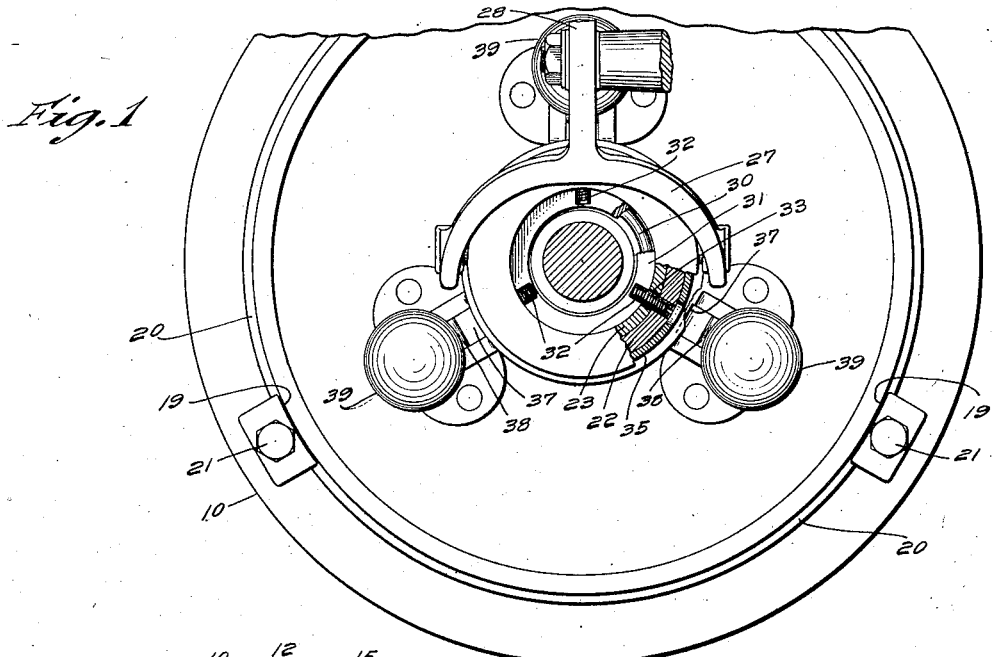

June 23, 1936.  M. G. GIORDANO  2,045,131

CLUTCH MECHANISM

Filed June 17, 1932

Inventor
Michael G. Giordano
By Nathaniel Frucht
his Attorney.

Patented June 23, 1936

2,045,131

UNITED STATES PATENT OFFICE 2,045,131

CLUTCH MECHANISM

Michael G. Giordano, Providence, R. I.

Application June 17, 1932, Serial No. 617,713

6 Claims. (Cl. 192—105)

My present invention relates to the automotive art, and has particular reference to the clutch mechanism thereof.

The standard clutch mechanism includes two opposed clutch disks which are normally held in engagement by spring pressure, and are manually released by means of a foot pedal. The clutch must therefore be released to change gears, and is normally in mesh during the running operation, whereby a slowing up in motor speed, or a clutching when the motor speed is too low, will stall the motor.

My present invention contemplates an automatic clutch which is operated by the motor mechanism in accordance with the speed thereof, and which does not require any manual release during running operation, thus obviating the disadvantages of the standard clutch mechanism. To this end, I have devised an automatic clutch having parts operatively connected to the motor mechanism, and including centrifugally actuated elements which move to automatically clutch and declutch the clutch disks in accordance with change in speed of the motor.

My invention thus comprises an arrangement of parts more fully disclosed in the detailed description following, in conjunction with the accompanying drawing, and more specifically defined in the claims appended thereto.

Figure 2:
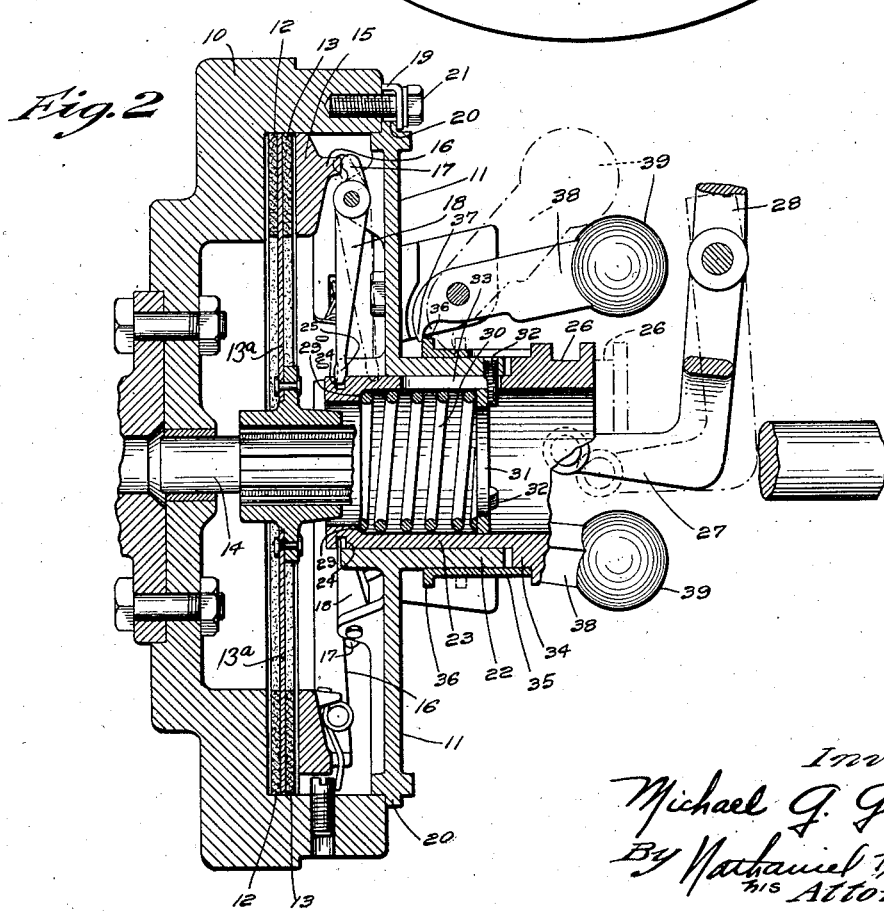

In the drawing,

Fig. 1 is an elevation of the novel clutch, the manual lock lever being omitted; and Fig. 2 is a central vertical section through Fig. 1.

Referring to the drawing, the fly wheel 10 is recessed as shown, and has the usual cover plate 11 seated on the front face thereof, to form a chamber which houses the driven clutch parts, these comprising the friction discs 12 and 13 secured to the driven disc 13a, the latter being splined to the driven shaft 14, and shifted axially in response to movement of the annular ring 15, which has the usual arcuate cam ribs 16 contacted by the cam ends 17 of the clutch finger levers 18, pivotally mounted on the rear face of the cover plate. The cover plate is locked to the fly wheel by means of saddles 19 which engage the peripheral rib 20 of the cover plate and are secured to the fly wheel by bolts 21 or the like, whereby the cover plate may be shifted to cause the cam ends 17 to ride up on the cam ribs 16 and thus compensate for wear.

The cover plate has the usual central hub section 22 extending from both faces thereof, the rear portion being cut away to accommodate the clutch finger levers. A control sleeve 23 is seated in the hub section, and comprises an annular slot 24 at the inner portion thereof in which the ends 25 of the clutch finger levers are received, the outer portion being laterally extended to project over the outer end of the hub section, and being formed with an annular slot 26 to receive the forked end 27 of a manual control lever 28.

As shown, the control sleeve has an inner rib or flange 29 against which one end of the clutch spring 30 engages, the other end being engaged by a spring collar 31 which is held in place by spaced lock screws 32 seated in the hub section and passing through longitudinal slots 33 in the control sleeve. The clutch spring therefore normally presses the control sleeve inward to move the clutch finger levers out of clutching position; the laterally extended outer portion of the control sleeve has an annular shoulder 34 which is engaged by an outer sleeve 35 to move the control sleeve against the spring compression.

The outer sleeve 35 has a flange 36 at the lower end thereof, which flange is engaged by cam fingers 37 of levers 38 pivotally mounted on the cover plate, and having weights 39 at the ends thereof.

The operation of the novel clutch mechanism may now be explained: The clutch spring normally holds the control sleeve in inward position, thus releasing the pressure of the clutch finger levers on the ring 15 and permitting movement of the clutch plate away from the back plate. If desired, this movement of the clutch plate may be assisted by a spring mechanism or the like of standard type, seated on the hub portion of the clutch plate and engaging the rear of the fly wheel.

As the speed of the motor, and therefore of the fly wheel, increases the weights 39 are moved outwardly by centrifugal force, thus shifting the outer sleeve and the control sleeve outwardly against the compresson of the clutch spring, and engaging the clutch. As the motor speed decreases, the clutch disengages.

When positive clutching is desired, regardless of motor speed, the lever 28 is shifted to move the control sleeve outwardly and thus cause clutch engagement.

My improved clutch mechanism is thus automatic in operation. With old style gear shifts, a deceleration declutches the motor to permit gear shifting, and an acceleration again clutches the motor; with new style gear shifts, the shifting may be accomplished without declutching.

The novel construction also permits automatic free wheeling, as the motor is declutched by throttling and reducing the speed thereof, and is again clutched by increasing the speed thereof.

The weights are designed to release the clutch at idling speed.

While I have described a specific embodiment of my invention, such changes in the arrangement and the proportion of the parts as are desirable for specific motor constructions may be made, within the spirit and the scope of the appended claims.

I claim:

1. In combination, a fly wheel, a driven shaft, a pressure clutch plate in said fly wheel, a driven clutch plate splined to the driven shaft, a control element slidable axially with respect to the fly wheel, means in said control element for sliding said control element in one direction, and means comprising weights movable upon increase of speed of said fly wheel and engaging said control element for sliding said control element in the opposite direction to engage the clutch plate.

2. In combination, a fly wheel, a driven shaft, a pressure clutch plate in said fly wheel, a driven clutch plate splined to the driven shaft, a control sleeve slidable axially with respect to the fly wheel, means in said control sleeve for sliding said control sleeve in one direction, and means comprising weights movable upon increase of speed of said fly wheel and engaging said control sleeve for sliding said control sleeve in the opposite direction to engage the clutch plate.

3. In combination, a fly wheel, a driven shaft, a cover device, a pressure clutch plate in said fly wheel, a driven clutch plate splined to the driven shaft, a control element slidable axially with respect to the fly wheel, means in said control element for sliding said control element in one direction, and means comprising weights pivotally mounted on said cover device movable upon increase of speed of said fly wheel and engaging said control element for sliding said control element in the opposite direction to engage the clutch plate.

4. In combination, a fly wheel, a driven shaft, a cover device having a central hub, a pressure clutch plate in said fly wheel, a driven clutch plate splined to the driven shaft, a control element slidable axially with respect to the fly wheel, means in said control element for sliding said control element in one direction, comprising a sleeve mounted on said hub and engaging said control element, and means comprising weights movable upon increase of speed of said fly wheel and engaging said sleeve for sliding said control element in the opposite direction to engage the clutch plate.

5. In combination, a fly wheel, a driven shaft, a pressure clutch plate in said fly wheel, a driven clutch plate splined to the driven shaft, a control element slidable axially with respect to the fly wheel, spring means in said control element for sliding said control element in one direction, and means comprising weights movable upon increase of speed of said fly wheel and engaging said control element for sliding said control element in the opposite direction to engage the clutch plate.

6. In combination, a fly wheel, a cover device, a driven shaft, a pressure clutch plate in said fly wheel, a driven clutch plate splined to the driven shaft, a control element mounted in said cover device and slidable axially with respect to the fly wheel, means for engaging the clutch plates on movement of the control element away from the fly wheel, spring means in said control element normally urging the control element towards the fly wheel, weighted lever means pivotally mounted in the cover device, and means for urging the control element away from the fly wheel upon movement of the weighted lever means in response to increase of speed of the fly wheel.

MICHAEL G. GIORDANO.